United States Patent [19]

Dauwalder

[11] 4,266,318
[45] May 12, 1981

[54] HAND RAIL ASSEMBLY
[75] Inventor: Fred R. Dauwalder, Yorkville, Ill.
[73] Assignee: Caterpillar Tractor Co., Peoria, Ill.
[21] Appl. No.: 83,991
[22] Filed: Aug. 29, 1979
[51] Int. Cl.³ .................. B60N 3/02; B60R 27/00
[52] U.S. Cl. .................. 16/111 R; 296/71;
105/461; 403/2
[58] Field of Search .............. 280/163, 727; 296/71;
105/354, 461; 16/125, 119, 111 R; 403/2

[56] References Cited

U.S. PATENT DOCUMENTS

| | | | |
|---|---|---|---|
| 654,492 | 7/1900 | Ross | 16/125 |
| 845,698 | 2/1907 | Curran | 105/461 |
| 1,652,052 | 12/1927 | Rukenbrod | 16/125 |
| 2,451,884 | 10/1948 | Stelzer | 16/111 R X |
| 3,698,144 | 10/1972 | Stratton | 403/2 X |
| 3,727,265 | 4/1973 | Camp | 16/125 |
| 3,972,431 | 8/1976 | Fischer | 294/106 |
| 4,072,339 | 2/1978 | Rothlisberger | 296/71 |
| 4,073,036 | 2/1978 | Bustin | 296/71 X |
| 4,086,728 | 5/1978 | Fosseen | 16/111 X |

*Primary Examiner*—Andrew V. Kundrat
*Attorney, Agent, or Firm*—Wegner, Stellman, McCord, Wiles & Wood

[57] ABSTRACT

A hand rail assembly (10, 110) including a graspable portion (14, 114) connected at spaced portions, such as ends (15, 18), to a support wall (11) with at least one of the connections (16, 116) being breakable by inadvertent application of high force to the hand rail assembly to avoid substantial damage to the hand rail assembly by such forces. The breakable connection may include a shear pin (30) or releasable ring (143) permitting the breakable connection to be broken by such high forces but assuring the connection to be maintained by forces normally applied to the hand rail assembly in normal use. The breakable connection may be provided at one or both ends of the graspable portion. In the illustrated embodiment, the breakable connection is provided at one end with the other end being provided with a swingable connection. The connections may include brackets (28, 35) or may be defined by distal end portions (140, 148) of the studs (121, 131) connected directly to the wall portion (11).

11 Claims, 5 Drawing Figures

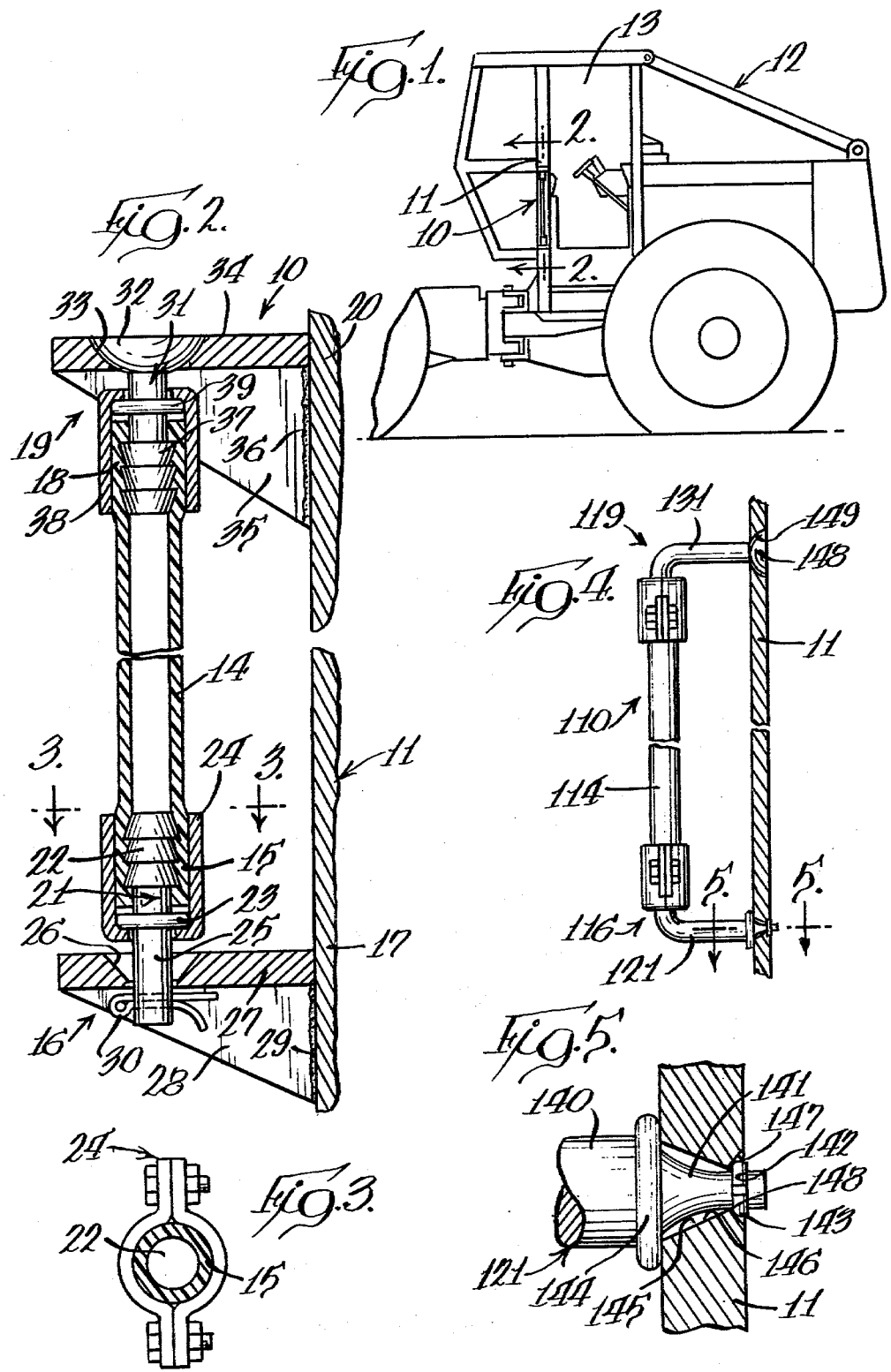

HAND RAIL ASSEMBLY

DESCRIPTION

1. Technical Field

This invention relates to hand rails and in particular to hand rail assemblies for use in applications where substantial forces may be inadvertantly applied thereto tending to break the hand rail from the support to which it is mounted.

2. Background Art

It is conventional to secure hand rails and the like on vehicles, such as logging vehicles, for use by the operator in getting into and out of the operator's cab. Further, there are numerous other applications wherein hand rails are provided for assisting a person's movement relative to an apparatus.

Where the apparatus, such as the exemplary logging vehicle, is utilized in environments wherein substantial forces may be inadvertently directed against the hand rail, such hand rails are commonly broken from their support requiring expensive and time-consuming maintenance and repair.

One example of a logging vehicle in which it is desirable to provide such a hand rail is shown in U.S. Pat. No. 3,972,431 of Robert L. Fischer, which patent is owned by the assignee hereof.

DISCLOSURE OF INVENTION

The present invention comprehends an improved hand rail assembly for use in such rigorous environments which avoids the maintenance problem of the prior art hand rail structures discussed above in a novel and simple manner.

More specifically, the invention comprehends the provision of such a hand rail assembly wherein a breakable connection is provided between one portion of the graspable element of the assembly and the support so that when a force is applied to the hand rail assembly tending to break the hand rail assembly from the support, the breakable connection permits separation of that portion of the assembly from the support without substantial damage to the remainder of the assembly.

The invention comprehends that the breakable connection be readily and economically remade and to this end, the breakable connection is provided with a shear pin for effecting such controlled breakability and simple replacement maintenance.

In the illustrated embodiment, the shear pin comprises a conventional cotter pin.

In the illustrated embodiment, the graspable means of the hand rail assembly comprises a stiff tubular element, such as a hose, with the connecting means defining barbed inserts adapted to be received in the opposite ends of the hose, with the hose ends being clamped thereto to provide a secured positive association of the graspable means with the connecting means.

In one form, the connecting means includes brackets mounted to the vehicle support wall with the graspable means then being secured to the brackets.

In another form, the connecting means defines end portions insertable through openings in the vehicle wall itself so as to be secured thereto with the securing means associated with the first of the connecting means being breakable. In the illustrated embodiment, the breakable means comprises a releasable ring mounted to the portion of the first connecting means inserted through the first vehicle wall opening.

The vehicle wall opening associated with the releasable ring may be provided with a frustoconical surface engaged by the ring having a preselected included angle so as to provide a desirable control over the amount of force necessary to break the first connecting means free of the vehicle wall.

The vehicle wall openings may have a tapered guide surface facing outwardly so as to provide facilitated guiding of the connecting means into the wall openings in the assembly of the hand rail thereto.

Thus, the hand rail assembly of the present invention is extremely simple and economical of construction while yet providing the highly desirable low maintenance and long life as discussed above.

BRIEF DESCRIPTION OF THE DRAWING

FIG. 1 is a fragmentary side elevation of a vehicle provided with a hand rail assembly embodying the invention;

FIG. 2 is a fragmentary enlarged vertical section taken substantially along the line 2—2 of FIG. 1;

FIG. 3 is a transverse section taken substantially along the line 3—3 of FIg. 2;

FIG. 4 is a fragmentary front elevation of a modified form of hand rail assembly embodying the invention mounted to a portion of a vehicle wall; and FIG. 5 is a fragmentary enlarged horizontal section taken substantially along the line 5—5 of FIG. 4.

BEST MODE FOR CARRYING OUT THE INVENTION

In the exemplary embodiment of the invention as disclosed in FIGS. 1-3 of the drawing, an improved hand rail assembly generally designated 10 is provided for use in an environment wherein substantial forces may be inadvertently applied thereto tending to break the assembly free of a mounting support, such as support 11 shown in FIG. 1. In the illustrated embodiment, the support forms a portion of a vehicle generally designated 12 which may comprise, as discussed above, a logging vehicle conventionally utilized in environments wherein inadvertent forces are often applied to the different parts of the vehicle in the normal use thereof. As shown in FIG. 1, the hand rail 10 may be utilized on the support 11 for assisting the user of the vehicle in getting into and out of the cab space 13 of the vehicle. Thus, the hand rail is adapted to accommodate substantial forces as directed thereagainst by the operator in assisting himself in such movement.

The invention, however, comprehends that the hand rail assembly 10 be breakable from the support 11 when a greater force is applied thereto, such as an inadvertent force applied thereto in the operation of the logging vehicle. The hand rail assembly is arranged so that the force tending to break the handrail free of the support 11 merely breaks a connection at one end of the assembly which connection may be readily remade with minimum cost and down time.

More specifically, referring now to FIGS. 2 and 3, the improved hand rail assembly 10 of the present invention includes a graspable means 14 which, in the illustrated embodiment, comprises a relatively stiff tubular element, or hose, having a first end 15 connected by a first connecting means 16 to a first portion 17 of the support wall 11. The opposite end 18 of the hose is connected by a second connecting means 19 to a spaced second portion 20 of the support wall 11.

In the illustrated embodiment, the graspable means comprises a relatively stiff tubular element, such as a hose. The first connecting means 16 includes a stud generally designated 21 having a barbed portion 22 received in hose end 15. The stud further includes a collar 23 which cooperates with a mounting element illustratively comprising a hose clamp 24 for constrictibly securing the hose end 15 to the barbed end 22 of the stud 21.

The stud further includes a shank 25 extending through an opening 26 in a horizontal wall portion 27 of a bracket 28 secured to the wall portion 17 as by welding 29. As shown in FIG. 2, the opening 26 is frustoconical, narrowing downwardly and thus defines a guide surface for facilitating the extension of the stud shank 25 downwardly therethrough. As further shown in FIG. 2, the stud shank is locked to the bracket by a cotter pin 30 which effectively defines a shear pin extending diametrically through the shank 25 subjacent the wall 27.

The upper connecting means 19 includes a stud 31 having a ball portion 32 received in a complementary rounded opening 33 in a horizontal wall portion 34 of an upper bracket 35 secured to the upper wall portion 20 by suitable means, such as welding 36.

Stud 31 further includes a barbed portion 37 which is received in the upper end 18 of the hose graspable portion 14. A mounting element illustratively comprising a hose clamp 38 is provided for clamping the hose end 18 to the stud portion 37, the mounting element 38 cooperating with a collar 39 on the stud 31 for retaining the hose end to the stud.

In the event a substantial force is inadvertently applied to the hand rail assembly 10 as during operation of the logging vehicle, movement of the graspable portion 14 causes upward movement of the lower stud portion 25 so as to shear the cotter pin 30 by its engagement with the wall 27 of lower bracket 28, thereby freeing the hand rail assembly and preventing further damage thereto by the applied force.

Reconnection of the hand rail assembly may be readily effected by simply reinserting the lower stud portion 25 downwardly to the frustoconical opening 26 to dispose the lower end subjacent the bracket wall 27 permitting replacement of the cotter pin 30 and reestablishing the hand rail assembly for further normal use.

As will be obvious to those skilled in the art, the strength of the cotter pin is preselected to assure that the hand rail assembly maintains its integrity relative to normal forces such as applied by the user in utilizing the hand rail in getting into and out of the vehicle cab. The strength of the shear pin is preselected to assure that the lower connection 16 is broken by forces greater than the normal expected forces so as to prevent damage to the other parts of the hand rail assembly as discussed above.

As will be obvious to those skilled in the art, any suitable shear pin may be utilized in providing the desirable breakable connection of the one portion of the hand rail assembly. As will further be obvious to those skilled in the art, a similar breakable connection may be provided at the upper end of the graspable portion if desired within the scope of the invention. Thus, the invention broadly comprehends the use of at least one breakable connection of the graspable portion of the hand rail assembly to the supporting wall.

Referring now more specifically to the embodiment of FIGS. 4 and 5, a modified hand rail assembly generally designated 110 is shown to comprise a hand rail assembly generally similar to hand rail assembly 10 but wherein the lower connection 116 and the upper connection 119 are defined by studs 121 and 131, respectively, directly connected to the wall 11 without the intermediary bracket structure of hand rail assembly 10. Thus, as shown, the lower stud 121 includes a turned end portion 140 having a tapered distal end 141 provided with a suitable groove 142 receiving a spring wire ring 143. At the large end of the tapered distal portion 141, the stud is provided with a collar 144.

As further seen in FIG. 5, wall portion 11 is provided with a first opening 145 including an outer frustoconical surface 146 serving as a guide surface for facilitating the insertion of the tapered portion 141 of the stud end therethrough. The opening 145 further includes a frustoconical outwardly widening outer surface 147 engaged by the spring wire retaining ring 143 and having an included angle preselected to require a preselected force acting on stud portion 140 to cause constriction of the retaining ring 143 on the stud end 141 into groove 142 suitably to pass through the minimum diameter portion 148 of opening 145 defined by the juncture of surfaces 146 and 147.

The upper stud 131 is provided with a ball portion 148 received in a complementary rounded opening 149 in the wall portion 11 to provide a swingable connection of the upper end of the hand rail assembly to the wall 11.

Thus, the hand rail assembly 110 functions generally similar to the hand rail assembly 10 in providing a breakable connection of one end of the graspable portion 114 to the vehicle wall 11 avoiding extensive damage to the hand rail assembly in the event of the inadvertent application of substantial forces thereto as in the operation of the vehicle. The retaining spring wire ring 143 re-establishes the breakable connection to wall 11 when the tapered portion 141 of the lower stud 121 is brought back through the lower opening 145 so as to re-establish the desired hand rail assembly configuration as shown in FIG. 4.

Thus, each of the embodiments of the invention disclosed in the drawing as discussed above provides a highly improved hand rail assembly structure wherein the hand rail is adapted to accomodate forces which would normally tend to greatly damage the hand rails of the prior art with the hand rail of the present invention utilizing a readily replaceable breakable connection to avoid such substantial damage. In each of the embodiments illustrated, at least one of the connections to the support is by means of such a breakable connection, it being understood that both connections thereof may be similarly breakable if desired.

In each of the embodiments, the strength of the hand rail assembly, breakable connection is preselected to assure that the hand rail provides positive support of the user in normal operation while yet providing positive breaking of the connection by substantially greater forces which would tend to damage the hand rail assembly.

INDUSTRIAL APPLICABILITY

Thus, the hand rail assembly is applicable for use in industrial applications wherein forces may be exerted thereon tending to tear the hand rail from the support to which it is attached. One illustrative example thereof is in a logging apparatus as discussed above. As will be obvious to those skilled in the art, such hand rails may be utilized not only in connection with industrial vehicles, but in any environment wherein such forces may be undesirably developed.

Other aspects, objects and advantages of this invention can be obtained from a study of the drawings, the disclosure and the appended claims. The foregoing disclosure of specific embodiments is illustrative of the broad inventive concepts comprehended by the invention.

I claim:
1. A hand rail assembly (10) comprising:
   graspable means (14);
   first breakable connecting means (16) associated with a first portion (15) of said graspable means for releasably securing said first portion to a support (11); and
   second connecting means (19) associated with a second portion (18) of said graspable means (14) spaced from said first portion (15) for providing a maintained securing of said second portion of the graspable means to the support notwithstanding a force being applied to said assembly sufficient to break said first connecting means (16), each of said first and second connecting means (16,19) comprising brackets (28,35) carried by the support (11), a mounting element (21) fixedly connected to the graspable means (14), first, breakable means (30) securing the mounting (21) of the first connecting means to the bracket (28) thereof, and second, unbreakable means (32) securing the mounting element (31) of the second connecting means (19) to the bracket (35) thereof.

2. A hand rail assembly (10) comprising:
   graspable means (14);
   first breakable connecting means (16) associated with a first portion (15) of said graspable means for releasably securing said first portion to a support (11); and
   second connecting means (19) associated with a second portion (18) of said graspable means (14) spaced from said first portion (15) for providing a maintained securing of said second portion of the graspable means to the support notwithstanding a force being applied to said assembly sufficient to break said first connecting means (16), said graspable means (14) comprising a tubular element, and said connecting means comprising studs (21,31) receivable in the opposite ends of the tubular element and clamps (24,38) embracing said opposite ends for forcibly securing said ends to said studs (21,31).

3. A hand rail assembly (10) comprising:
   graspable means (14);
   first breakable connecting means (16) associated with a first portion (15) of said graspable means for releasably securing said first portion to a support (11); and
   second connecting means (19) associated with a second portion (18) of said graspable means (14) spaced from said first portion (15) for providing a maintained securing of said second portion of the graspable means to the support notwithstanding a force being applied to said assembly sufficient to break said first connecting means (16), said graspable means (14) comprising a hose, and said connecting means comprises barbed studs (21,31) receivable in the opposite ends of the hose and hose clamps (24,38) embracing said opposite ends for forcibly securing said ends to said barbed studs.

4. The hand rail assembly of claim 1, 2 or 3 wherein said graspable means (14) comprises a stiff tubular element.

5. The hand rail assembly of claim 1, 2 or 3 wherein said graspable means (14) comprises a stiff hose element having opposite ends (15,18) secured one each to said first and second connecting means.

6. The hand rail assembly of claim 1, 2 or 3 wherein said first breakable means comprises a shear pin (30).

7. The hand rail assembly of claim 2 wherein said first connecting means (121) comprises a member having one end connected to said graspable means (114) and an opposite end (140), and means (143) for releasably retaining said opposite end (140) in secured relationship with the support (11).

8. A hand rail assembly (10,110) comprising:
   a support (11) having spaced openings (26,33,145,149); graspable means (14,114);
   first, breakable connecting means (16,116) associated with a first portion (15,140) of said graspable means and having a portion (25,141) received in a first means and having a portion (25,141) received in a first (26,145) of said openings for releasably securing said first portion (15,140) to the support (11); and
   second connecting means (19) associated with a second portion (18,131) of said graspable means (14,114) spaced from said first portion and having a portion (32,148) received in a second (33,149) of the said openings for providing a maintained securing of said second portion (18,131) of the graspable means (14,114) to the support (11) notwithstanding a force being applied to said assembly sufficient to break said first connecting means (16,116), said first connecting means (116) including a ring (143) constrictably mounted to said portion (141) of the first connecting means (116) received in said first opening (145) for releasably retaining said portion (141) therein in the absence of said force applied to the assembly.

9. The hand rail assembly of claim 8 wherein said ring comprises a wire spring ring (143).

10. The hand rail assembly of claim 8 wherein said first opening (145) is defined by a frustoconical surface (147) engaged by said ring (143) in the installed arrangement thereof, the included angle of said frustoconical portion being preselected to require the force applied to said assembly sufficient to cause constriction of said ring for breaking said first connecting means to be a preselected high force.

11. The hand rail assembly of claim 8 wherein said first opening (145) is defined by an outwardly tapering guide surface (146) for guiding said first connecting means portion (141) into said first opening (145) and constricting said ring (143) suitably to pass through said first opening (145).

* * * * *